(12) United States Patent
Hannington (10) Patent No.: US 9,821,531 B2
(45) Date of Patent: Nov. 21, 2017

(54) THERMOFORMABLE THREE DIMENSIONAL RETROREFLECTIVE ARTICLE AND METHOD OF MANUFACTURE

(71) Applicant: Avery Dennison Corporation, Glendale, CA (US)

(72) Inventor: Michael E. Hannington, Madison, OH (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/182,930

(22) Filed: Jun. 15, 2016

(65) Prior Publication Data

US 2016/0297173 A1    Oct. 13, 2016

Related U.S. Application Data

(62) Division of application No. 12/620,028, filed on Nov. 17, 2009, now Pat. No. 9,427,935.

(Continued)

(51) Int. Cl.
   *B32B 5/16* (2006.01)
   *B32B 3/08* (2006.01)
   (Continued)

(52) U.S. Cl.
   CPC ............... *B32B 5/16* (2013.01); *B32B 3/08* (2013.01); *B32B 7/12* (2013.01); *B32B 27/14* (2013.01);
   (Continued)

(58) Field of Classification Search
   CPC ....... B32B 3/08; B32B 2605/08; B32B 37/06; B32B 7/12; B32B 27/14; B32B 27/36;
   (Continued)

(56) References Cited

U.S. PATENT DOCUMENTS 2,354,018 A    7/1944 Heltzer et al.
2,354,048 A    7/1944 Palmquist
(Continued)

FOREIGN PATENT DOCUMENTS

EP    0602599 A1    6/1994
EP    0693697 A2    1/1996
(Continued)

OTHER PUBLICATIONS

International Search Report and Written Opinion issued in corresponding International Application No. PCT/US2009/064734 dated Feb. 18, 2010.

(Continued)

*Primary Examiner* — Vishal I Patel
(74) *Attorney, Agent, or Firm* — Avery Dennison Corporation (57) ABSTRACT

A three dimensional retroreflective article having an outer surface with a reflectivity of at least about 200 lux, and method for making such an article from a thermoformable laminate is provided. The laminate includes a base layer of thermoformable plastic sheet material; and a layer of microbeads configured in a high-density arrangement and silvered on their bottom sides to enhance retroreflectivity. The microbeads are adhered to an outer surface of the base layer by a thermoformable cushion coat which may include a phosphorescent pigment to further enhance reflectivity. A protective sheet of transparent thermoformable sheet material overlies and may be in contact with the layer of microbeads. The laminate is heated and thermoformed into a self supporting three dimensional article having a pre-selected shape and an encapsulated bead retroreflective surface having a reflectivity of at least about 200 lux. The thermoforming step imparts sufficient non-planarity in the resulting retroreflective surface so that retroreflective dead spots created by (Continued)

contact between the microbeads and the protective sheet of transparent sheet material are effectively optically cancelled by overlapping zones of retroreflectivity generated by the microbeads.

18 Claims, 6 Drawing Sheets

Related U.S. Application Data (60) Provisional application No. 61/115,567, filed on Nov. 18, 2008.

(51) Int. Cl.
  *G02B 5/128* (2006.01)
  *B32B 7/12* (2006.01)
  *B32B 27/14* (2006.01)
  *B32B 27/36* (2006.01)
  *B32B 37/06* (2006.01)

(52) U.S. Cl.
  CPC ............ *B32B 27/36* (2013.01); *B32B 37/06* (2013.01); *G02B 5/128* (2013.01); *B32B 2255/04* (2013.01); *B32B 2255/205* (2013.01); *B32B 2264/101* (2013.01); *B32B 2264/107* (2013.01); *B32B 2307/4026* (2013.01); *B32B 2307/412* (2013.01); *B32B 2307/416* (2013.01); *B32B 2307/422* (2013.01); *B32B 2437/00* (2013.01); *B32B 2590/00* (2013.01); *B32B 2605/08* (2013.01); *Y10T 428/24364* (2015.01)

(58) Field of Classification Search
  CPC .......... B32B 2255/04; B32B 2255/205; B32B 2264/101; B32B 2264/107; B32B 2307/4026; B32B 2307/412; B32B 2307/416; B32B 2307/422; B32B 2437/00; B32B 2590/00; B32B 5/16; G02B 5/128; Y10T 428/24364
  See application file for complete search history.

(56) References Cited

U.S. PATENT DOCUMENTS

| | | | |
|---|---|---|---|
| 2,354,049 A | 7/1944 | Palmquist | |
| 2,403,752 A | 7/1946 | Phillippi | |
| 2,948,191 A * | 8/1960 | Hodgson, Jr. .......... | G02B 5/128 156/277 |
| 3,190,178 A | 6/1965 | McKenzie | |
| 3,885,246 A | 5/1975 | Tung | |
| 3,971,692 A | 7/1976 | Anderson | |
| 4,102,562 A | 7/1978 | Harper et al. | |
| RE29,742 E | 8/1978 | Tung | |
| 4,272,564 A | 6/1981 | Grewe et al. | |
| 4,496,618 A | 1/1985 | Pernicano | |
| 4,605,461 A | 8/1986 | Ogi | |
| 4,678,695 A | 7/1987 | Tung et al. | |
| 5,064,272 A | 11/1991 | Bailey et al. | |
| 5,069,964 A | 12/1991 | Tolliver et al. | |
| 5,415,911 A * | 5/1995 | Zampa ................... | B32B 37/12 359/529 |
| 5,601,915 A | 2/1997 | Ochi et al. | |
| 5,812,316 A | 9/1998 | Ochi et al. | |
| 5,824,390 A | 10/1998 | Ochi et al. | |
| 5,835,271 A | 11/1998 | Stump et al. | |
| 5,959,775 A | 9/1999 | Joseph et al. | |
| 6,156,436 A * | 12/2000 | Joseph ................... | G02B 5/128 359/540 |
| 6,586,067 B2 | 7/2003 | Levenstein | |
| 6,677,028 B1 | 1/2004 | Lasch et al. | |
| 6,677,030 B2 | 1/2004 | Thakkar et al. | |
| 2003/0006005 A1* | 1/2003 | Northey ................. | G02B 5/124 156/290 |
| 2003/0151815 A1 | 8/2003 | Hannington | |
| 2006/0238871 A1 | 10/2006 | Lee | |

FOREIGN PATENT DOCUMENTS

| | | |
|---|---|---|
| EP | 0693697 A3 | 6/1998 |
| EP | 0602599 B1 | 10/1998 |
| EP | 0693697 B1 | 2/2003 |
| WO | 96/35970 | 11/1996 |
| WO | 97/10378 | 3/1997 |

OTHER PUBLICATIONS

International Preliminary Report on Patentability issued in corresponding International Application No. PCT/US2009/064734 dated Feb. 28, 2011.

* cited by examiner

THERMOFORMABLE THREE DIMENSIONAL RETROREFLECTIVE ARTICLE AND METHOD OF MANUFACTURE

CROSS-REFERENCE TO RELATED APPLICATIONS

The present application is a division of U.S. patent application Ser. No. 12/620,028 filed Nov. 17, 2009, which claims the benefit of U.S. Provisional Patent Application No. 61/115,567 filed Nov. 18, 2008, both of which are incorporated herein by reference in their entireties.

FIELD OF THE INVENTION

This invention generally relates to articles made from thermoformable retroreflective sheet materials, and is specifically concerned with three dimensional retroreflective articles formed from thermoformable materials that include an outer surface with a reflectivity of at least about 200, and method for making such an article from a thermoformable laminate.

BACKGROUND OF THE INVENTION

Retroreflective articles employing an outer layer of microbeads are known in the prior art. In one method of manufacture, a bead-containing coating is applied over the outer surface of the article (which may be, for example, protective helmet). The coating is allowed to dry, and is then etched to expose the microbeads. Later, a transparent sheet of vinyl chloride or other polymeric material is molded into the same shape as the article, and mounted over the outside surface, advantageously encapsulating them while leaving a small air space between the transparent material and the tops of the microbeads. Such encapsulation both protects the beads and prevents direct contact between the beads and ambient moisture, which could interfere with their retroreflective properties.

In another method of manufacture, a flexible, microbead-containing sheet material is applied over the outer surface of the article. Such sheet materials are known which have a sufficient amount of stretch to allow them to be evenly adhered over the surfaces of embossed license plates, road cones and road markers. In still another method, a microbead containing, non-woven fabric is used to make retroreflective vests and other garments for highway workers working at night.

Unfortunately, none of the known manufacturing techniques is believed to be capable of easily and quickly producing a rigid three-dimensional article having an encapsulated bead outer surface capable of high intensity retroreflection (defined in this application as a reflectivity of between about 200 to about 300 lux) without further manufacturing or assembly steps. The application and processing of a bead-containing coating over the surface of such an article is relatively cumbersome and time consuming. Moreover, it is difficult to obtain the kind of high-density arrangement of the microbeads necessary to achieve high retroreflectivities of about 200 lux or more due to the irregular heights and distribution of the beads in the bonding material. Finally, such a method requires the separate fabrication and application of a protective transparent sheet material over the bead layer to encapsulate the beads.

While the application of a flexible, bead-containing retroreflective sheet material over the surface of the article may be practical for articles having simple shapes (such as license plates, road cones and other generally planar items), and does allow for a uniform and high density arrangement of microbeads, it is clearly more difficult to uniformly apply to tightly rounded and complex shapes, such as protective helmets with reinforcing ridges, protective padding or guards (e.g. knee pads, shine guards) or highly contoured shapes, such as automotive bumpers, body panels, grills and mirror housings. Of course, such a method might be modified such that only strips of retroreflective were applied to the article. However, such a modification would compromise the visibility and total reflectivity of the surface. Additionally, while many such flexible retroreflective sheet materials include a protective coating of transparent material over the bead layer, they do not include an encapsulating protective transparent sheet material that provides an air space over the bead layer. The use of such an "enclosed bead structure" in such sheet materials undesirably limits the retroreflectivity of the article to about 180 lux or less.

Clearly, there is a need for method for producing a self-supporting three dimensional article having a high-intensity retroreflective surface which is easier and less time consuming than the aforementioned prior art methods. Ideally, such a method would be easily applicable to virtually any shape, and would allow the microbeads to be arranged over the entire outer surface of the article in a high-density configuration to maximize retroreflectivity. Finally, such a method would provide a transparent sheet material over the layer of microbeads to provide the advantages of encapsulation without the need for additional fabricating steps.

SUMMARY OF THE INVENTION

Generally speaking, the invention is both a three dimensional (substantially non-planar) retroreflective article, a laminate and method for making such an article having an outer surface with a reflectivity of at least about 200 lux that overcomes the aforementioned shortcomings associated with the prior art. A principle aspect of the invention stems from the applicant's observation that the thermoforming of an encapsulated microbead retroreflective sheet material, under certain conditions, can produce a three dimensional article of virtually any shape with a high reflectivity of about 200-300 lux. Previous to the applicant's invention, it was thought that the necessary softening of any transparent encapsulating layer overlying a thermoformable microbead laminate would cause the encapsulating layer to fuse over the tops of the microbeads, thereby fatally destroying the necessary airspace between the microbeads and the encapsulating layer and creating reflection-degrading "dead spots" over the tops of the microbeads which would make it impossible to achieve high-intensity retroreflectivity. Contrary to conventional wisdom, applicant observed through experimentation that the "dead spot" phenomenon could be made far smaller than anticipated by the use of variable-diameter microbeads (mircrobeads which are non-uniformly sized) and the use of selected types of polymers for the encapsulating layer which "pull-back" as a result of cooling after thermoforming, thereby recreating the necessary air space. The problems associated with dead spots are apparently further concealed or largely cancelled out by the overlapping zones of retroreflectivity caused by the contours of most three dimensional articles.

Accordingly, the retroreflective three dimensional article of the invention comprises a laminate formed from a base or first layer of thermoformable plastic sheet material, the first layer having first and second sides; a layer of retroreflective microbeads adhered to an outer surface or first side of said base material by a thermoformable cushion coat, and a protective sheet or second layer of transparent thermoformable sheet material overlying the layer of microbeads, where there is some variation in the diameter of the microbeads. The laminate is thermoformed into a self supporting three dimensional article, which is generally non-planar, having a pre-selected shape and an encapsulated bead retroreflective surface having a reflectivity of at least about 200 lux. The protective sheet may be in contact with some of the microbeads, and may be colored. The microbeads are configured in a high-density arrangement and are silvered on their bottom sides to provide high-intensity retroreflection. The cushion coat may include a phosphorescent pigment to further enhance reflectivity, and is preferably a layer of binder containing a polyvinyl copolymer, a thermoplastic polyurethane, and an aminoplast resin. The transparent layer preferably has a thickness of between about 4-8 times an average diameter of the microbeads, and the base layer preferably has a thickness of between about 4 to 12 times an average diameter of the microbeads. Such a ratio facilitates the thermoforming method of the invention while still providing the amount of rigidity to the completed article necessary for it to preserve its shape. Both the protective transparent layer and the base layer may be formed from a thermoformable plastic material such as PETG (glycol-modified polyethylene terephthalate). The use of PETG as the protective transparent layer advantageously results in some degree of "pull back" from the microbeads upon cooling after thermoforming. The use of variable diameter microbeads limits fusing contact between the protective transparent layer and only the largest diameter microbeads. The surface of the three dimensional article preferably is sufficiently non-planar so that retroreflective dead spots created by limited amount of contact between the microbeads and the protective sheet of transparent sheet material are effectively optically cancelled by overlapping zones of retroreflectivity generated by the microbeads.

The method of the invention generally comprise the steps of adhering, via aforementioned cushion coat, a plurality of retroreflective, semi-silvered microbeads in a high-density arrangement onto the base layer of thermoformable plastic sheet material; overlying the protective sheet of transparent, thermoformable sheet material in contact with the retroreflective microbeads adhered to the base layer to form a generally flat combination layer; applying sufficient heat to the combination layer to render it thermoformable, and thermoforming the heated combination layer into a three dimensional article having a pre-selected shape and an encapsulated bead retroreflective surface having a reflectivity of at least about 200 lux. Preferably, the thermoforming step imparts sufficient non-planarity in the resulting retroreflective surface so that retroreflective dead spots created by contact between the microbeads and the protective sheet of transparent sheet material are effectively optically cancelled by overlapping zones of retroreflectivity generated by the microbeads.

DETAILED DESCRIPTION OF THE PREFERRED EMBODIMENTS

Figure 1:
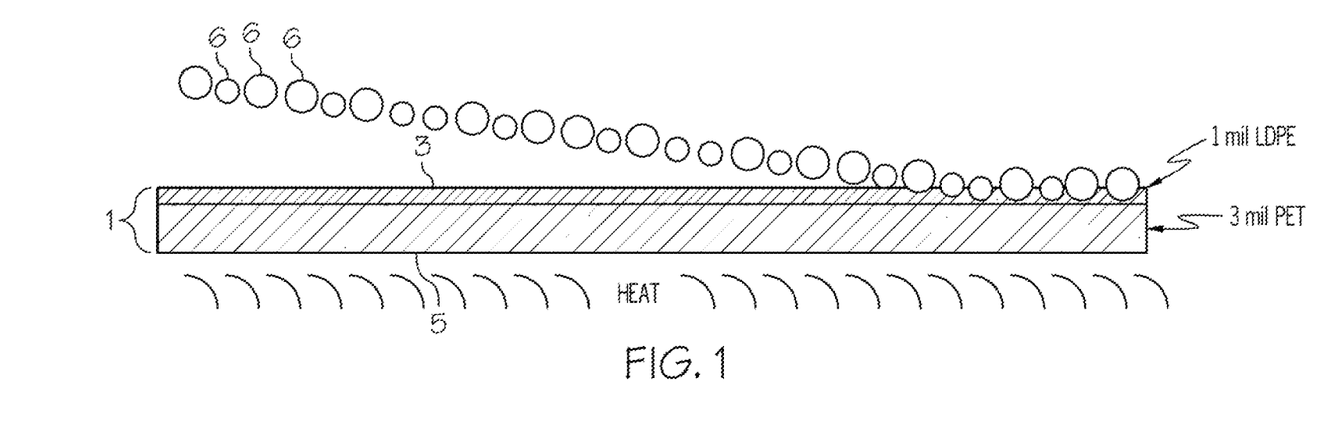
FIG. 1 illustrates the first step in the method of assembling the thermoformable laminate of the invention, wherein microbeads are adhered in a dense arrangement and randomly distributed over a donor sheet consisting of layer of adhesive overlying a support layer of polyethylene terephthalate.
Figure 2:
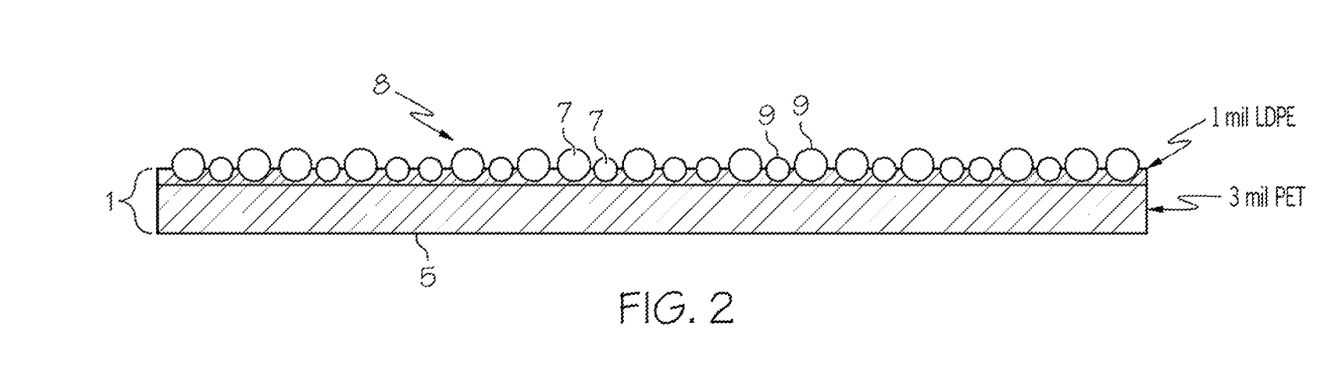
FIG. 2 illustrates the step of metallizing the bottom halves of the microbeads on the donor sheet.

FIGS. 1 and 2 illustrate the first steps in fabricating the thermoformable laminate used in the method of making the high intensity retroreflective article of the invention. In these first steps, a bead donor sheet 1 is prepared by adhering a 1 mil thick sheet 3 of low density polyethylene over a 3 mil thick layer of a substrate 5, which in this example is a sheet of polyethylene terephthalate. Heat is next applied to the resulting bead donor sheet 1 via a heat source (not shown) in order to soften the 1 mil thick sheet 3 of low density polyethylene. The substrate 5, having a higher melting point, is able to support the softened sheet 3 throughout this step. Glass or ceramic microbeads 6 are next applied over the softened sheet 3. Preferably, the microbeads 6 have an average diameter of between about 40 and 90 microns, with a variation of ±15%. For example, if microbeads having an average diameter of 50 microns are selected, the range of diameters would vary between 42.5 microns to 57.5 microns. As will be discussed in more detail hereinafter, such a variation in diameter advantageously creates air spaces between most of the microbeads and the transparent protective sheet that ultimately forms the top layer of the resulting thermoformable laminate. The beads 6 are applied over the heat-softened, 1 mil thick sheet 3 of low density polyethylene in a high-density arrangement where the beads 6, on average, are practically touching one another.

As shown in FIGS. 1 and 2, the microbeads 6 sink into the heat softened sheet 3 until their bottom halves are at least partially embedded into the low density polyethylene forming the sheet 3. The heat source is removed in order to allow the donor sheet 1 to cool and the 1 mil thick sheet 3 of low density polyethylene to harden, which in turn weakly adheres the microbeads 7 to the donor sheet 1. Next, as schematically indicated in FIG. 2, the exposed hemispheres of the beads 6 are metallized by the application of a thin layer 9 on the order of 300 nanometers of vapor-deposited aluminum. This step results in a bead donor sheet 1 having a high density layer 8 of semi-metallized microbeads 7 weakly adhered to the sheet 3 of low density polyethylene.

Figure 3:
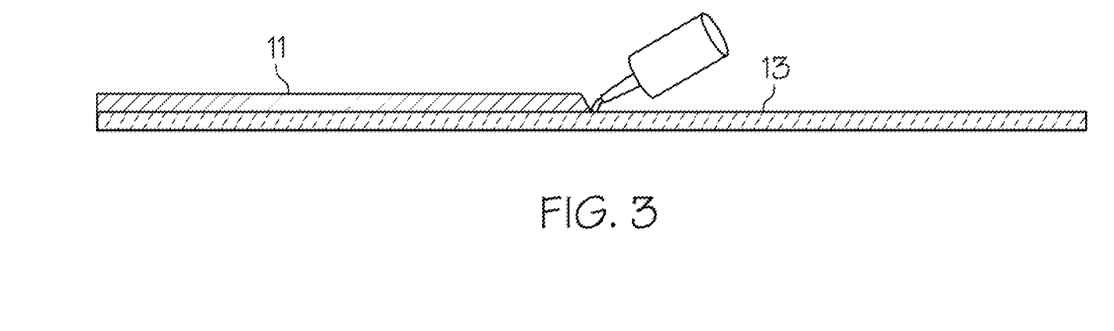
FIG. 3 illustrates the step of applying an adhesive cushion coat over a removable substrate.
Figure 4:
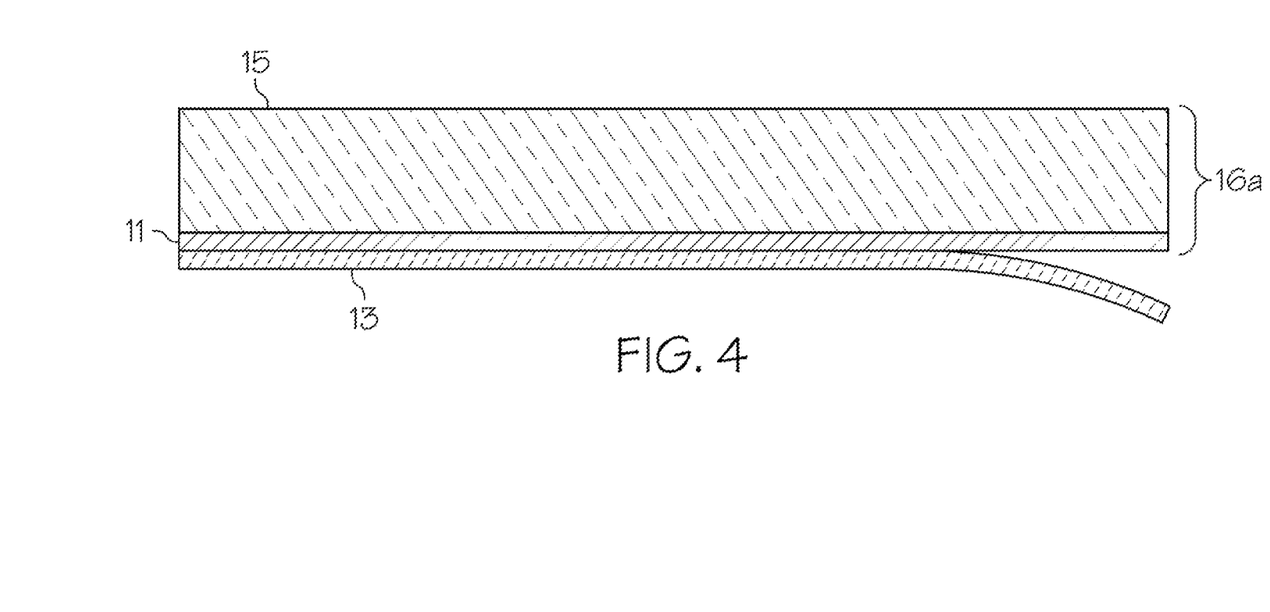
FIG. 4 illustrates the step of adhering a thermoformable support sheet over the exposed surface of the cushion coat and peeling off the removable substrate.

Separately from the fabrication of the bead donor sheet, an adhesive cushion coat 11 is applied to a thermoformable support sheet 15, as illustrated in FIGS. 3 and 4. This is accomplished by first applying a cushion coat 11 over a 2 mil thick sheet 13 of polyethylene terephthalate, as schematically illustrated in FIG. 3. Preferably, the cushion coat 11 is formed from a layer of white pigmented binder containing a polyvinyl copolymer, a thermoplastic polyurethane, and an aminoplast resin as disclosed in Levenstein U.S. Pat. No. 6,586,067, and assigned to the Avery Dennison Corporation the common assignee of the instant application. The thickness of the cushion coat 11 is approximately ⅔ the average diameter of the beads, or about 2 mils. To enhance the reflectivity of the laminate that ultimately results form these steps, the cushion coat may include a phosphorescent pigment. The exposed face of the cushion coat 11 is next heat laminated to a thermoformable support sheet 15, as schematically indicated in FIG. 4. Preferably, support sheet 15 is a 20-30 mil thick sheet of glycol-modified polyethylene terephthalate, although other thermoformable plastic materials may also be used. Finally, the 2 mil thick sheet 13 of polyethylene terephthalate is peeled off of the cushion coat 11, as is also indicated in FIG. 4. This is easily done as the cushion coat 11 is adhered more strongly to the support sheet 15 of glycol-modified polyethylene terephthalate as a result of the heat lamination than to the 2 mil thick sheet 13 of polyethylene terephthalate. This step results in a sub-laminate 16a consisting of the support sheet 15 and cushion coat 11.

Figures 5, 6:
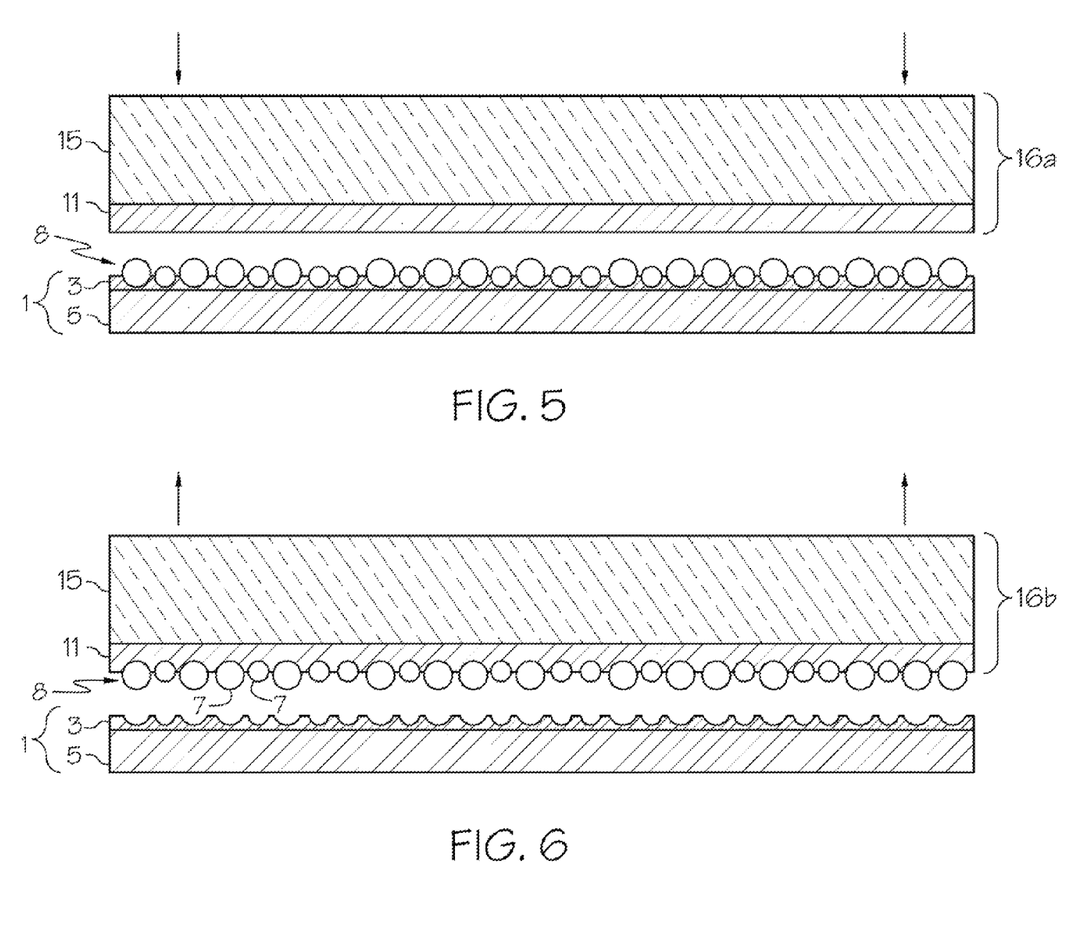
FIG. 5 illustrates the step of pressing the thermoformable support sheet and the exposed surface of the adhesive cushion coat onto the layer of metallized beads on the top surface of the donor sheet.
FIG. 6 illustrates how the adhesive cushion coat removes the layer of metallized beads from the donor sheet.

FIGS. 5 and 6 illustrate how the bead donor sheet 1 of FIG. 2 and the sub-laminate 16a of FIG. 4 are brought together to form a beaded sub-laminate 16b formed from the layer 8 of semi-metallized microbeads 7, the cushion coat 11, and the support sheet 15. In these steps of the method, the exposed side of the cushion coat 11 is positioned over the layer 8 of semi-metallized microbeads 7 overlying the donor sheet 1 and is pressed into contact so that the cushion coat 11 adheres to the metallized hemispheres of the beads 7, as indicated in FIG. 5. Next, the support sheet 15 and cushion coat 11 is lifted off of the face of the donor sheet 1, as is indicated in FIG. 6. As the cushion coat strongly adheres to the microbeads 7, and the solidified sheet 3 of low density polyethylene of the donor sheet adheres only weakly to the microbeads 7, the layer 8 of semi-metallized microbeads is lifted off of the donor sheet, forming a beaded sub-laminate 16b.

Figure 7:
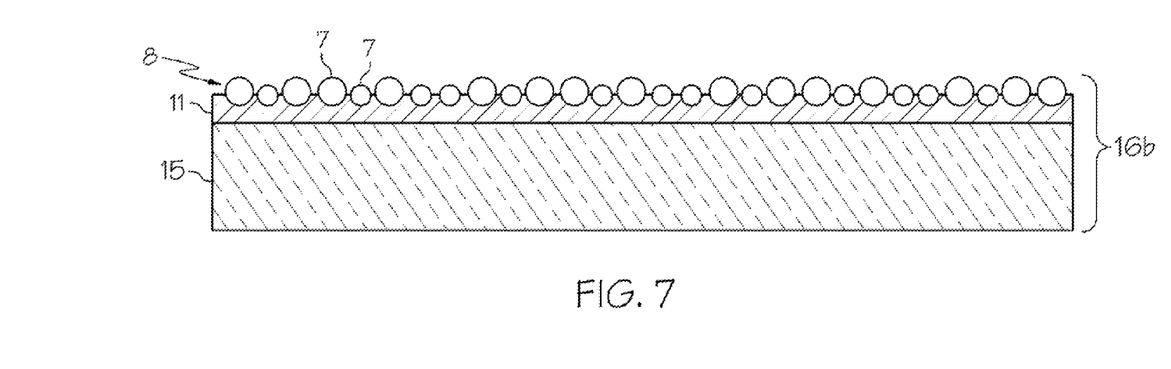
FIG. 7 illustrates the laminate resulting from the step illustrated in FIG. 6.
Figure 8:
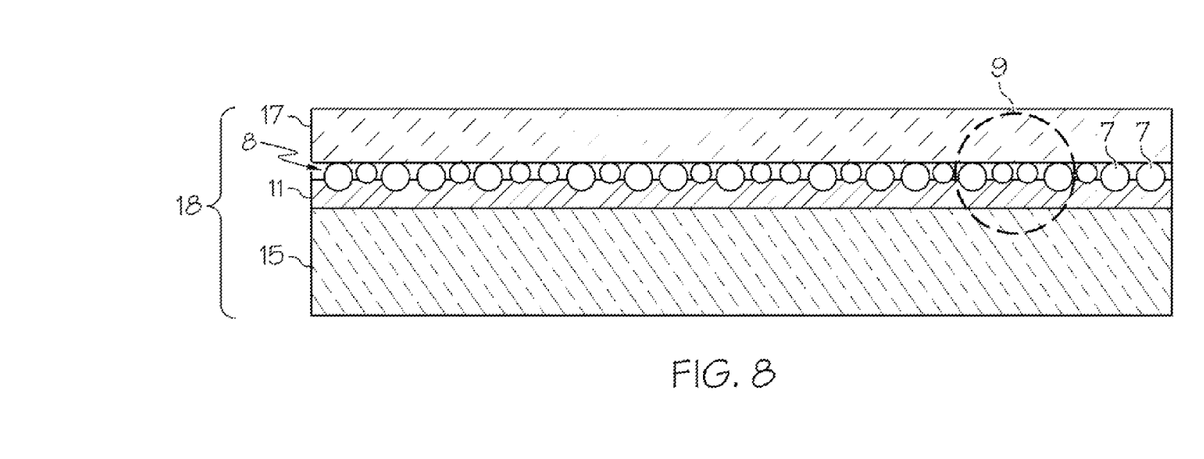
FIG. 8 illustrates the final step of assembling the thermoformable laminate of the invention, wherein a protective sheet of thermoformable, transparent sheet material is positioned over the microbeads adhered over the substrate of thermoformable plastic material.

FIGS. 7 and 8 illustrate the final steps in forming the laminate used in fabricating the high-intensity retroreflective articles of the invention. The beaded sub-laminate 16b or combination layer formed in the step illustrated in FIG. 6 is removed from the donor sheet 1 and righted into the position illustrated in FIG. 7. A thermoformable, transparent sheet material 17 is positioned over the sub-laminate 16b to form the thermoformable laminate 18 used to fabricate the three dimensional articles of the invention. While the sheet material 17 is preferably transparent, it may be colored or tinted as desired to give the final article formed from the laminate 18 a desired color or appearance. Alternatively, the sheet material 17 may possess a color-neutral transparency and a desired coloring of the final article may be achieved by the inclusion of a coloring pigment (either phosphorescent or otherwise) in the cushion coat 11. The transparent sheet material 17 may be placed over the beaded sub-laminate 16b either before, after, or at the time of the thermoforming of the beaded sub-laminate 16b into a three dimensional article. In the preferred embodiment, transparent sheet material 17 is a 20-30 mil thick sheet of glycol-modified polyethylene terephthalate, as such a plastic would have substantially the same thermoforming characteristics as the support sheet 15 (which is also formed from glycol-modified polyethylene terephthalate) and would have sufficient thickness to both protect the bead layer 8 and to contribute to the desired, self-supporting rigidity of the final thermoformed article.

Figure 9:
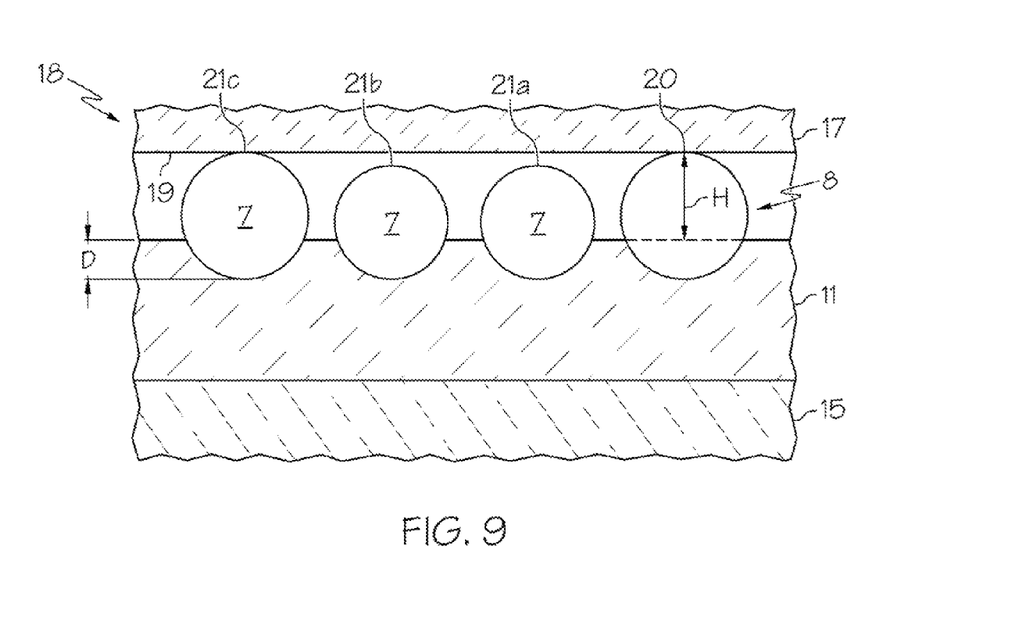
FIG. 9 is an enlargement of the area circled in phantom in FIG. 7 and illustrates how the natural variation in the diameter of the microbeads causes only some of the microbeads to tangentially contact the underside of the transparent protective sheet material prior to thermoforming.
Figure 10:
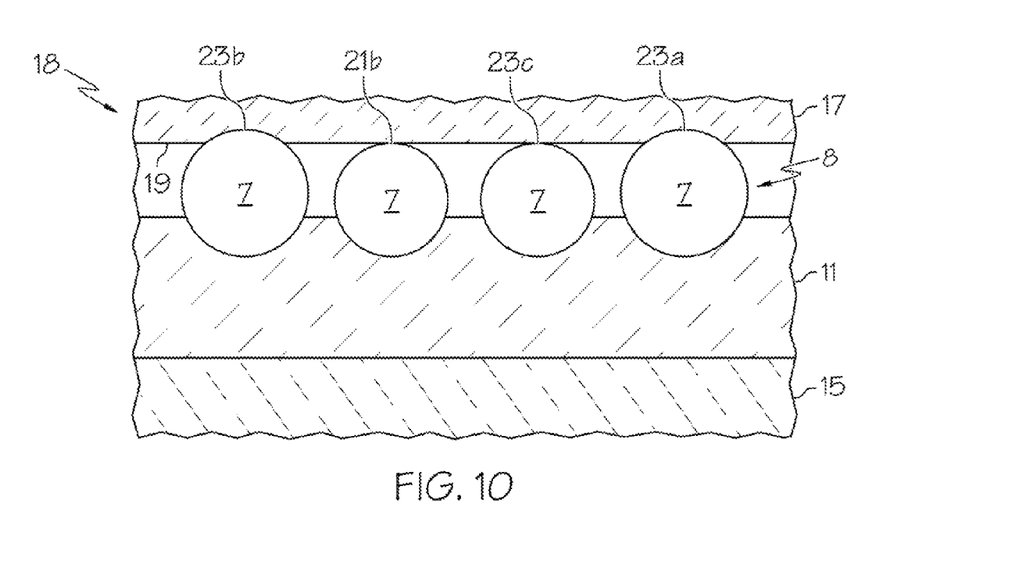
FIG. 10 illustrates how the softening of the protective, transparent sheet material during thermoforming of the laminate causes the sheet to sag and fusingly contact the top ends of the microbeads.
Figure 11:
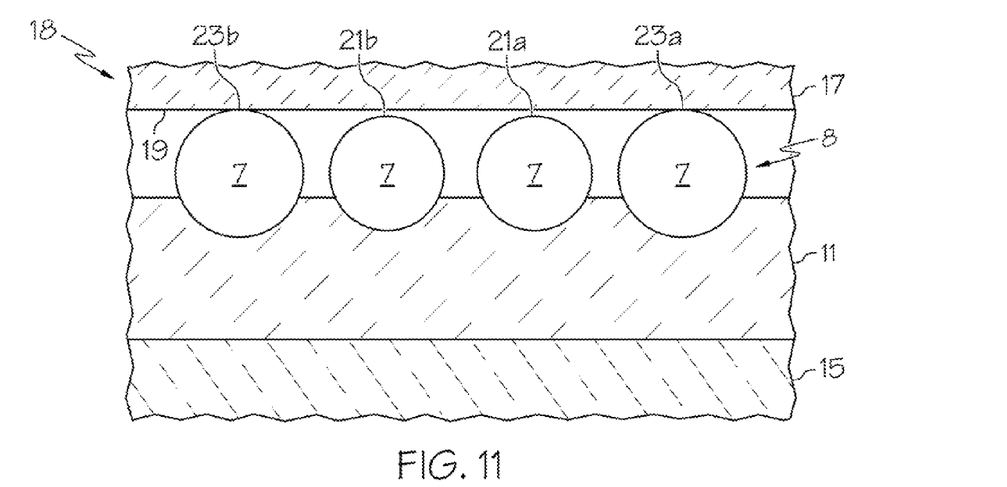
FIG. 11 illustrates how the transparent, protective sheet material shown in FIG. 10 "pulls back" out of contact with many of the microbeads after cooling, thereby leaving most of the microbeads with an air space between the transparent protective sheet and the tops of the microbeads.

FIGS. 9, 10 and 11 illustrate how the laminate 18 of the invention advantageously maintains its high intensity retroreflective optical characteristics through the process of thermoforming the laminate into a three dimensional article. Specifically, FIG. 9 is an enlargement of the area circled in phantom shown by reference numeral 9 in FIG. 8, and illustrates in particular the interface between the tops of the bead 7 and the lower surface 19 of the transparent protective sheet 17. Due to the natural variation in the diameter of the beads 7, as well as variations in the depth "D" that these beads extend into the cushion coat 11, there are variations in the relative height "H" in the beads 7. As a consequence, the only contact between the transparent protective sheet 17 and the beads 7 is tangential point contact 20 between the lower surface 19 and the tops of only the highest beads 7. Such contact advantageously leaves air spaces 21a, 21b and 21c of varying widths between the tops of the other beads and the lower surface 19 of the transparent protective sheet 17 which in turn allows the microbeads 7 to operate at maximum retroreflectivity with only a small number of narrow-angle "dead spots" caused by the infrequent tangential point contact 20 between the microbeads 7 and the lower surface 19 of the transparent protective sheet 17.

FIG. 10 illustrates how the interface between the lower surface 19 and the tops of the microbeads 7 changes when the transparent protective sheet 17 is heat-softened incident to the thermoforming of the laminate 18 into a three dimensional article. Preferably, such heat softening of the sheet 17 occurs simultaneously with the heat softening of the sub-laminate 16b in order to minimize the amount of time, steps and power necessary to thermoform a three dimensional article of the invention. However, if desired, the transparent protective sheet 17 may be separately thermoformed over an article thermoformed from the sub-laminate 16b. FIG. 10 is applicable to both variations in the method of the invention, and illustrates how the softening and drawing down of the transparent protective sheet 17 over the tops of the microbeads 7 broadens the interface between the lower surface 19 and the microbeads to areas 23a, 23b and 23c of fusing contact of varying sizes, such areas being largest (23a) between the highest microbeads and smaller (23b and 23c) with lower microbeads, but nonexistent between the lowest microbeads 7 and the lower surface 19 (note air space 21b). If left uncorrected, the substantial number amount and areas of fusing contact between the microbeads 7 and the lower surface 19 of the transparent protective sheet 17 could seriously impair the retroreflective ability of the beads 7 due to the number and broad angularity of the optical "dead spots" resulting from such interfaces.

FIG. 11 illustrates how the specific thicknesses and composition of the transparent protective sheet 17 eliminates much of the fusing contact between the microbeads 7 and the lower surface 19 when the transparent protective sheet 17 is allowed to cool after a thermoforming operation. The applicant has found that the thermal contraction of a transparent protective sheet of the aforementioned composition and thickness range results in "pull back" of the lower surface 19 from the tops of the microbeads that either eliminates or at least substantially reduces the resulting final amount of contact between the lower surface 19 and the microbeads 7 such that an air space 21a, 21b is restored between the surface 19 and about half or more of the microbeads.

Figure 12:
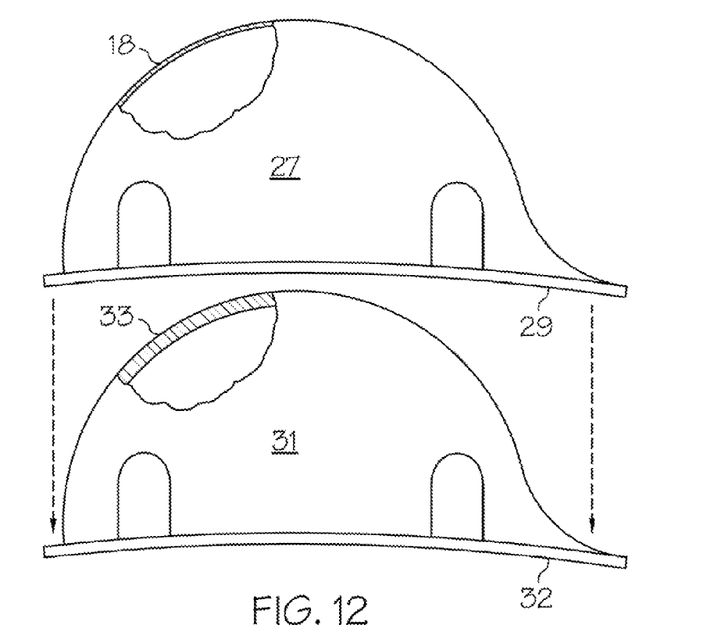
FIG. 12 illustrates how a three dimensional helmet shell thermoformed from the laminate illustrated in FIG. 11 is rapidly assembled over a conventional construction safety helmet to render it brightly retroreflective.

FIG. 12 illustrates a practical application of a high retroreflectivity, three dimensional article in the form of an outer hard hat shell 27. In this example of the invention, shell 27 is thermoformed from the laminate 18 in the same shape as the outer surface of a hard hat 31. The shell 27 may include flanges (not shown) around its lower edge 29 that "snap fit" around the lower edge 32 of the hard hat to secure it firmly in place. The hard hat 31 is in turn formed from a layer 33 of fiberglass composite to give it the strength required to protect construction workers from falling objects in a construction site. Such shells have actually been fabricated by the applicant in accordance with the method and laminate described herein, and have a measured reflectivity of about 300 lux due to the large number of microbeads 7 that do not come into fusing contact with the lower surface of the transparent protective sheet 17 due to the variations in bead height coupled with the previously described "pull back" phenomenon that occurs upon the cooling of a transparent protective sheet 17 selected in conformance with the invention. Additionally, the applicant has noted that to the extent that fusing contact between the microbeads 7 and the lower surface 19 exists after cooling of the sheet 17, the effect of the resulting optical "dead spots" is neutralized by the overlapping of the zones of retroreflectivity of the microbeads 7 caused by the curvature and contours which are naturally part of any three dimensional article.

Different modifications, additions, and variations of this invention may become evident to the persons in the art. For example, the transparent protective sheet 17 could be separately thermoformed from the sub-laminate 16b and snap-fitted over the layer 8 of microbeads of the article.

It will thus be seen according to the present invention a highly advantageous thermoformable laminate for use in creating generally non-planar, three dimensional objects has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventor hereby states his intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A method for making a three dimensional article having a high intensity retroreflective outer surface, comprising the steps of:
    adhering a plurality of retroreflective microbeads having a variation in diameter in a high-density arrangement onto a base layer of thermoformable plastic sheet material;
    overlying a protective sheet of transparent, thermoformable sheet material in contact with the retroreflective microbeads adhered to the base layer to form a combination layer, wherein said protective sheet engages a top surface of some of the microbeads to form airspaces and create infrequent tangential point contact between at least a portion of said protective sheet and some of the microbeads;
    applying sufficient heat to the combination layer to render it thermoformable; and
    thermoforming the heated combination layer into a three dimensional article having a pre-selected shape and an encapsulated bead retroreflective surface having a reflectivity of at least about 200 lux;
    wherein the protective sheet comprises glycol-modified polyethylene terephthalate (PETG); and
    wherein the protective sheet has a thickness of 20 mils to 30 mils.

2. The method of claim 1, wherein the retroreflective microbeads have an average diameter of between about 2 and 4 mils and are adhered to said layer of thermoformable plastic sheet material by a cushion coat.

3. The method of claim 2, wherein said cushion coat includes a phosphorescent pigment to enhance the reflectivity of said surface.

4. The method of claim 1, including a further step of cooling the combination layer to allow formation of an air space after the step of thermoforming.

5. The method of claim 1, including a further step of applying a metalized layer after the step of adhering the microbeads to the base layer.

6. The method of claim 1, including a further step of peeling the base layer off after the step of applying sufficient heat.

7. The method of claim 1, wherein said three dimensional article has a curved or faceted surface.

8. The method of claim 1, wherein the base layer is formed from PETG.

9. The method of claim 1, wherein the microbeads are semi-silvered, having a silvered side that is adheringly engaged to said base layer.

10. The method of claim 1, wherein the protective sheet of transparent material is colored.

11. The method of claim 1, wherein the thickness of the base layer is between about 4 to 12 times an average diameter of the microbeads.

12. The method of claim 1, wherein the thickness of the protective sheet is between about 2 to 10 times an average diameter of the microbeads.

13. The method of claim 1, wherein the thickness of the protective sheet is between about 4 to 8 times an average diameter of the microbeads.

14. The method of claim 1, wherein the microbeads have an average diameter of between about 40 and 90 microns.

15. The method of claim 2, wherein the cushion coat comprises a polyvinyl copolymer, a thermoplastic polyurethane, and an aminoplast resin.

16. The method of claim 1, wherein the variation is ±15%.

17. The method of claim 2, wherein the cushion coat has a thickness of approximately ⅔ the average diameter of the microbeads.

18. The method of claim 1, wherein the microbeads are metallized.

* * * * *